Jan. 28, 1930.　　　C. H. HAPGOOD　　　1,745,092
MILKING MACHINE
Filed Nov. 17, 1926　　2 Sheets-Sheet 1

WITNESS:

INVENTOR
Cyrus Howard Hapgood
BY
Buser and Harding
ATTORNEYS.

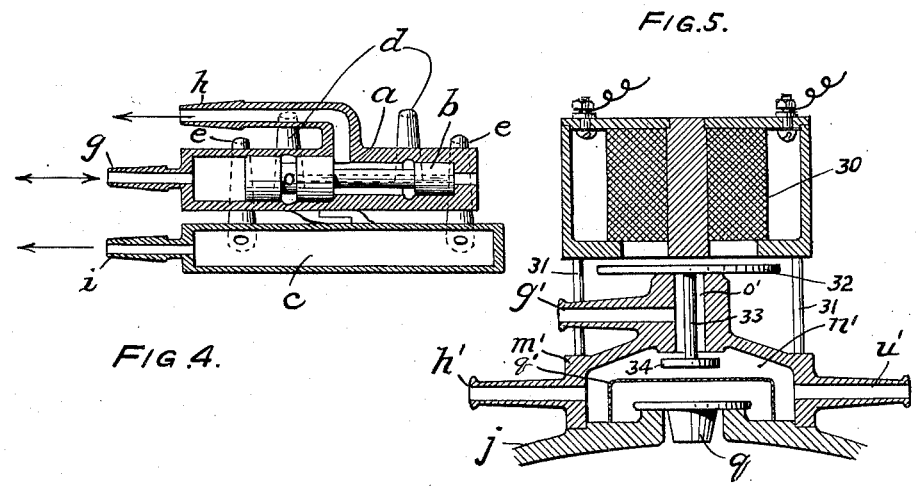
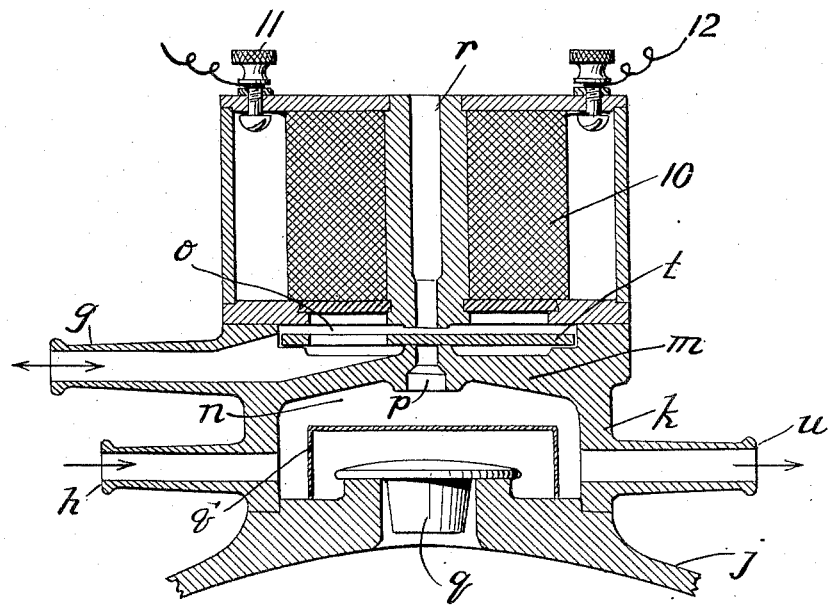

Patented Jan. 28, 1930

1,745,092

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

MILKING MACHINE

Application filed November 17, 1926. Serial No. 148,787.

It is known in the art to provide a milking machine comprising a double-chambered teat cup, a pulsation pipe and a secondary pneumatic pulsator connected with, and controlled in its operation by the pulsations in, said pipe, and connected with, and producing pulsations in, the outer chamber of the teat cup, and to provide a vacuum and milk pipe connection from the inner teat cup chamber through the pulsator to the milk pail. It is also known, in such a construction, to provide a vacuum pipe line from the milk pail to the vacuum pump, a primary pneumatic pulsator adapted to produce pulsations in a pipe connected with the secondary pulsator, and electrically operated means, controlled from the pump, for operating the primary pneumatic pulsator. The pulsations from the primary pneumatic pulsator may convey pulsations direct to the outer teat cup chamber, but it is distinctly preferable to provide two pneumatic pulsators, one, a primary pulsator, being directly operated by the electrically operated means and in turn operating another, or secondary pulsator, which produces the pulsations that are conveyed to the outer teat cup chamber. Such a milking machine is disclosed in the Daysh and Hapgood Patent, No. 1,405,104, dated January 21, 1922.

The present invention has for its object to improve and simplify the Daysh-Hapgood invention. Among the features of novelty are a novel arrangement on the cover of the milk can of a vacuum chamber, a pulsation chamber, a primary pneumatic pulsator valve and the electrically operated means for immediately actuating said valve; and the extreme simplification of the electrically operated means and the pulsator valve whereby the latter is made integral with the armature of the magnet, the latter, in fact, being so shaped and positioned as to function also as a pulsator.

A preferred embodiment of the invention is shown in the accompanying drawings, in which—

Fig. 3 is a vertical section through the milk pail cover and the primary pulsation structure mounted thereon.

Fig. 4 is a longitudinal sectional view of the secondary pulsator.

Fig. 5 is a vertical sectional view of a modification.

Figures 1, 2:
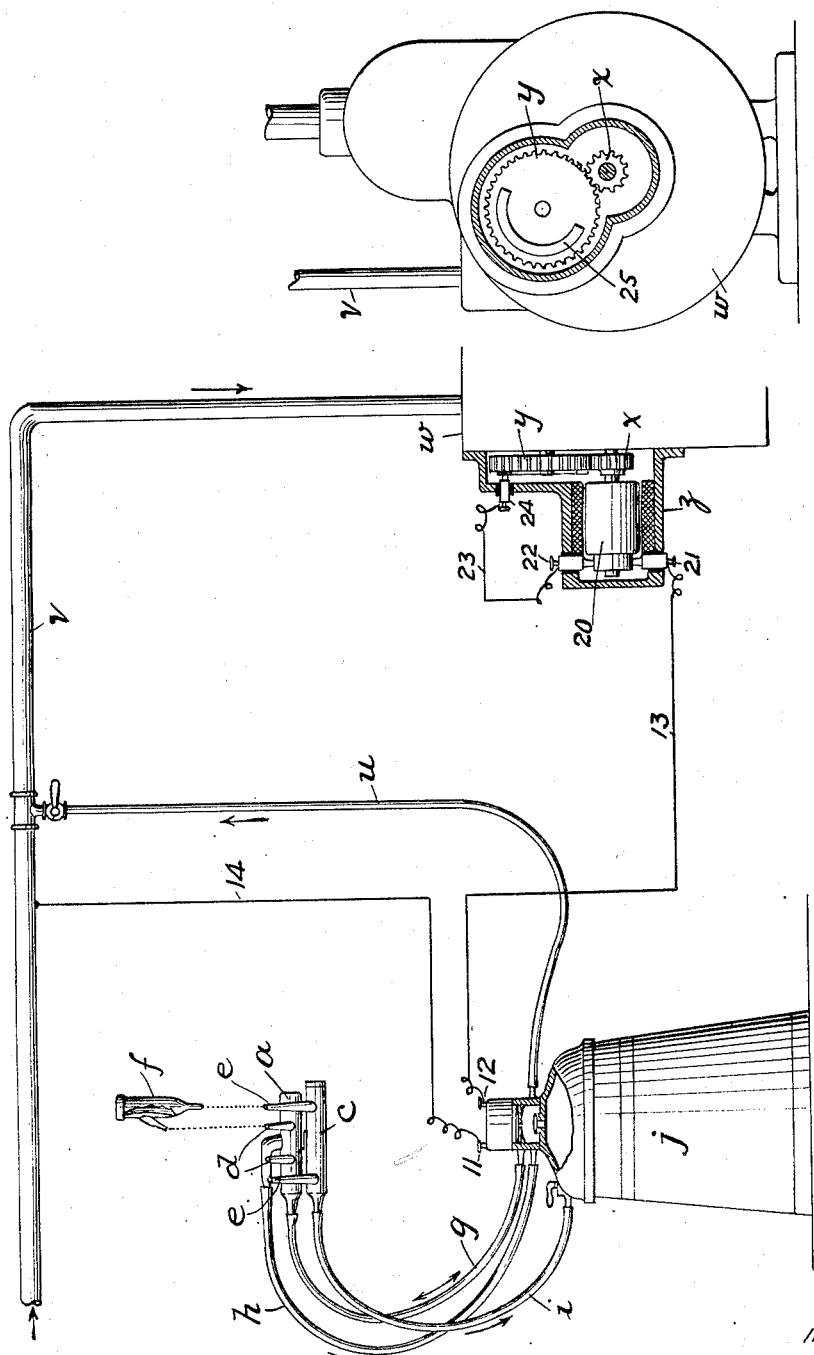
Fig. 1 is a side elevation, partly in section, of a complete milking machine.
Fig. 2 is an end view of the vacuum pump.

The secondary pneumatic pulsator (which is preferably but not necessarily employed) may be of the construction shown in the Leitch Patent No. 1,255,186, dated February 5, 1918. It comprises (see Figs. 1 and 4) a pulsator chamber $a$ communicating with a pulsation pipe $g$ and a vacuum pipe $h$ and having nipples $d$ adapted for connection with the pulsation chambers of the teat cups $f$; a pulsator valve $b$ in said chamber and operable by pneumatic pulsations communicated through pulsation pipe $g$; and a milk chamber $c$ communicating with a milk pipe $i$ and having nipples $e$ adapted for connection with the milk chambers of the teat cups $f$. Milk pipe $i$ connects with the interior of milk pail $j$.

On a cover of milk pail $j$, and preferably detachable from such cover, is a casing $k$ divided by a web $m$ into chambers $n$ and $o$. The lower chamber $n$ is under constant vacuum and communicates, through check valves $q$ and $q'$ with the interior of the milk pail. Vacuum chamber $n$ has a nipple adapted for connection with pipe $h$. Chamber $o$ has a nipple adapted for connection with pulsation pipe $g$. In web $m$ is a port $p$ affording communication between chambers $n$ and $o$. Above chamber $n$ is a vertical tube $r$ affording a port communicating with chamber $o$ and open to the atmosphere. A disc valve $t$ is movable either into position (as shown) to close port $p$ and open port $r$ or into position to close port $r$ and open port $p$. Valve $t$ thus acts as a pulsator, in that it opens pipe $g$ to connection alternately with atmosphere and with suction.

Surrounding tube $r$ is the field winding of an iron-encased magnet 10 having terminals 11 and 12. Valve $t$ functions also as the armature of the magnet. It is obvious that if the circuit to the magnet be closed intermittently, valve $t$ will be intermittently raised. When the circuit to the magnet is open, valve $t$ is free to drop by gravity, but its downward movement is positively insured by the constant suction on its lower face.

Vacuum chamber $n$ has a nipple which is adapted for connection with a pipe $u$, which is detachably connectible with the vacuum pipe line $v$ connected with a vacuum pump $w$, which may be of the type set forth in the Hall Patent No. 1,374,650 and the Leitch Patents Nos. 1,367,554 and 1,378,881.

The shaft of the vacuum pump has a pinion $x$ which is in driving connection with a gear $y$ carrying a semi-circular contact strip 25.

Affixed to the vacuum pump casing is a casing $z$ enclosing an electric generator 20 as well as pinion $x$ and gear $y$. One of the brushes 21 of the generator is connected through an electrical connection 13 with terminal 12 of magnet 10. The other brush 22 of the generator is connected, through an electrical connection 23 with a brush 24 carried on casing $z$ and adapted, in the rotation of gear $y$, to intermittently contact with strip 25.

An electrical connection 14 is conveniently made between terminal 11 of magnet 10 and the vacuum pipe line $v$; thereby enabling the circuit to be closed when brush 24 contacts with strip 25.

When brush 24 moves out of contact with strip 25, the circuit to magnet 10 is open and the combination armature-valve $t$ moves into the position shown in Fig. 4. Air flows through port $r$, chamber $o$ and pipe $g$ to the secondary pulsator, whose valve $b$ shifts to connect the pulsation chambers of two of the teat cups with atmosphere and the pulsation chambers of the other two teat cups with vacuum.

When brush 24 moves into contact with strip 25, the circuit to the magnet is closed and the combination armature-valve $t$ is drawn up, thereby connecting pipe $g$, through chamber $n$, with the vacuum line $u$, $v$, thereby causing valve $b$ of the secondary pulsator to shift to connect the pulsation chambers of two pairs of teat cups with atmosphere and suction respectively in a manner the reverse of that which occurs in the shift of valve $b$ in the opposite direction.

The secondary pulsator may be dispensed with, in which case pipe $h$ would be eliminated and pipe $g$ would be connected direct with the pulsation chambers of the teat cups. This arrangement is fully operative, but it would not give the advantage of imparting pneumatic pulsations to two pairs of teat cups alternately.

A notable advantage of my improvement is the extreme simplicity of the construction, in that the element $t$ performs the double function of an armature of the magnet and a pneumatic pulsator valve.

It is not intended to limit the claims to the specific construction shown. An example of a modification embodying the same broad invention is shown in Fig. 5. In this construction, a casing $m'$ is applied to the milk pail cover. The casing forms with the cover a vacuum chamber $n'$, which, like chamber $n$ of the other construction, is connected, by means of a pipe $u'$, with the vacuum line $v$, and by means of a pipe $h'$ with the secondary pulsator of Fig. 4 if a secondary pulsator is used. The casing has an upwardly extending tubular or hollow head, the interior of which constitutes an air passage or chamber $o'$ which, like chamber $o$ of the other construction, is connected, by means of a pulsator pipe $g'$, with the secondary pulsator if one is used, or direct with the pulsation chamber of the teat cup if a secondary pulsator is not used.

A series of pedestals 31, supported on casing $m'$, supports the casing of an electromagnet 30, which is positioned above, and spaced from, the head of the casing. The armature of the magnet comprises a disc 32, a rod 33 depending therefrom and extending through chamber $o'$ and a disc 34 within chamber $n'$. This armature, like member $t$ of the other construction, also functions as a valve.

When the circuit through the magnet is opened, the armature valve 32—33—34 drops into the position shown, closing the port at the top of chamber $o'$ and opening the port at the bottom of chamber $o'$, and pipe $g'$ is connected, through chamber $o'$ and pipe $u'$ with vacuum. When the circuit through the magnet is closed, the valve is lifted, closing the port at the bottom of chamber $o'$ and opening the port at the top of chamber $o'$, and atmospheric air is admitted through chamber $o'$ into pipe $g'$.

Having now fully described my invention, what I claim and desire to protect by Letters Patent is:

1. A pulsator adapted to produce pneumatic pulsations in the pulsation pipe of a milking machine, comprising a valve casing having a ported web dividing it into a pulsation chamber and vacuum chamber, the pulsation chamber having a port adapted to communicate with a source of higher pressure and a port adapted to communicate with the pulsation pipe, the vacuum chamber having a port adapted to communicate with a source of vacuum, a valve within the pulsation chamber tending to seat on the port in the web, the suction in the vacuum chamber tending to so seat it, and electrically operated means adapted to intermittently move the valve off its said seat into position to close the pressure port.

2. The combination with a milk pail, of a pulsator adapted to produce pneumatic pulsations in the pulsation pipe of a milking machine and comprising a vacuum chamber centrally above the pail, a plusation chamber above the vacuum chamber, there being three vertically aligning ports, one connecting the vacuum chamber with the milk pail, another connecting the two chambers and another connecting the pulsation chamber with a source of higher absolute pressure, an intermittently operable electro-magnet, and a valve functioning also as an armature of the magnet and movable thereby into position to open one of the last two named ports and close the other.

3. In a milking machine, in combination, a milk receiver, a vacuum pipe line, a secondary pneumatic pulsator, a primary pneumatic pulsator carried on the pail and operable to connect the secondary pulsator alternatively with the vacuum pipe line and with a source of higher pressure, an electric circuit, and means mounted on the pail and operable in the opening and closing of said circuit to control the operation of the primary pulsator.

4. The combination with a milk pail, of a pulsator adapted to produce pneumatic pulsations in the pulsation pipe of a milking machine and comprising a vacuum chamber centrally above the pail and means connecting the vacuum chamber with a source of suction, a pulsation chamber above the vacuum chamber, there being three vertically aligning ports, one connecting the vacuum chamber with the milk pail, another connecting the two chambers and another connecting the pulsation chamber with a source of higher absolute pressure, an intermittently operable electromagnet, and a combination valve and magnet armature movable by said electromagnet into position to open the second named port and at the same time close the third named port and movable by unbalanced pneumatic pressure to close the second named port and open the third named port.

5. The combination specified in claim 4 in which the combination valve and magnet armature comprises solely a freely floating disc positioned in the pulsation chamber between, and the opposite sides of which are adapted to seat against, the last two named ports.

6. A pulsator adapted to produce pneumatic pulsations in the pulsation pipe of a milking machine, comprising means providing a connection from a source of vacuum to the pulsation pipe and a connection from a source of higher pressure to the pulsation pipe, and means to produce pulsations in the pulsation pipe comprising an electromagnet and its armature, the latter being positioned to act as a single valve adapted to open and close both of said connections and comprising a single relatively wide and thin disc adapted, in one of its movements, to seat against one pole of the magnet.

In testimony of which invention, I have hereunto set my hand, at city of New York, on this 9th day of November, 1926.

CYRUS HOWARD HAPGOOD.